United States Patent Office 2,839,343
Patented June 17, 1958

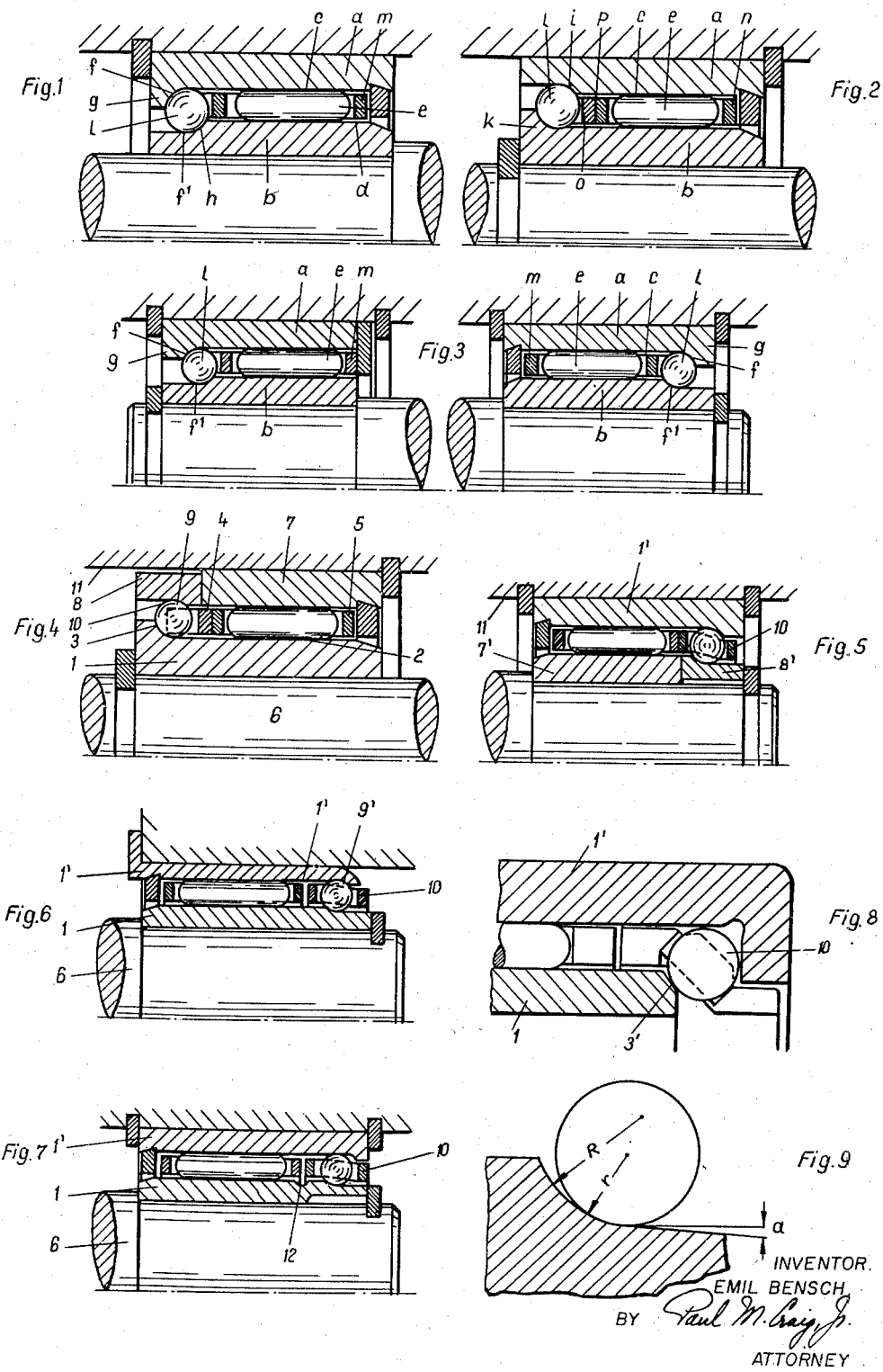

2,839,343

RADIAL NEEDLE AND AXIAL ROLLER BEARING

Emil Bensch, Herzogenaurach, Germany, assignor to Industriewerk Schaeffler O. H. G., Herzogenaurach, Bavaria, Germany, a firm Application April 19, 1954, Serial No. 424,395

Claims priority, application Germany April 24, 1953

14 Claims. (Cl. 308—174)

Needle bearings are used in many instances in order to be able to utilize one of their most important advantages, namely their small radial dimensions. However, the axial forces must frequently be taken up outside the bearing. It has therefore been proposed to combine an axial roller bearing with a radial needle bearing. Former suggestions in this direction have not given satisfaction because they mean an enlargement of the bearing diameter and frequently require additional constructional parts.

As a consequence, the object of the invention is to render possible the combination of a radial needle bearing with an axial roller bearing without the dimensions in radial direction being enlarged and without it being necessary to produce and fit additional constructional parts. It is likewise directed to the control of the centrifugal forces which become considerable at high speeds of rotation.

This object is attained according to the invention in a manner which is both simple and progressive, in that the needle raceways of the outer and inner bearing rings merge into the raceways of the rolling elements, also worked into these rings. Thus the raceways of the rolling elements constitute in a certain sense only an extension of the needle raceways if suitably constructed. Therefore the bearing rings in continuation of the needle raceways are stepped shoulderlike to form the raceways for the rolling elements, one facing inwards and the other outwards. If it is a question of raceways for balls, an arcuate offset portion is provided.

The construction may be such that the needles and the balls are mounted both inside and outside in such a manner that they by themselves or with the inner race ring or the outer race ring form a continuous constructional element. It is possible to guide the needles and the balls in a common cage with windows for the needles and open pockets for the balls. However, two separate cages may be provided for the needles and the balls in such a manner that the needles are guided in a window cage and the balls in a comb cage extending from the end thereof.

According to the invention a combined radial needle and axial rolling bearing is produced which can be so constructed as to retain the usual small space-saving dimensions of the needle bearing. This bearing presents important advantages both as regards production and also as regards assembly, but not least as regards its possible range of use. Seeing that, as above mentioned, the needle raceways and the rolling element raceways merge into each other, all force components which are produced are taken up by the outer and inner bearing rings. Additional constructional elements can be dispensed with for absorbing such components. The diameters of the raceways can be chosen so that the peripheral speeds are mutually synchronized in the most favorable manner.

By mounting the needles and the balls in a common cage or in two separate cages the assembly of the bearing is considerably simplified. The advantage is derived that no loose needles or balls have to be inserted separately. The mounting of the needles and the balls in their cage can be effected in any suitable manner. In any case the needles and the balls with the outer or with the inner raceway then form a constructional unit.

In addition to these advantages, the invention also presents the great improvement that the bearing enables assembly on a shaft having a relatively great amount of adjustable axial play and nevertheless takes up in a perfect manner the axial forces which are produced. If bearings according to the invention are employed in pairs, the taking up of the axial forces in both directions is possible even if it is necessary to allow the shaft axial play. This play can be established in the construction by spacers, naturally making allowance for the expansion of the constructional elements, without thereby affecting the radial guiding of the shaft together with the needles. In this connection there is also the advantage that the setting in the axial direction is not dependent upon the skill and care of the fitter, as in other bearings. The inner and outer rings can be firmly seated on the shaft and fixed in the housing with all the necessary precautions against inaccurate machining. In any case the cylindrical raceway of the needle bearing takes up the axial compensation.

In addition there are the technical advantages in construction which consist in that the inner and outer rings are each a simple turned part with a small amount of machining. By simultaneously grinding the ball and needle raceways their true running cooperation is directly obtainable. The cages for the needles and for the balls can be formed from a common blank.

If in such a bearing the inner needle raceway is in one piece with the inner raceway for the balls, the raceway for the needles and that for the balls are concentric to each other when rotating. If the outer raceway for the needles is eccentric to the centre of the inner ring by the amount of the radial play and the amount of elastic radial deformation, the outer ball raceway is also eccentric to the inner ball raceway if the inner ring is in one piece.

As the play-free races of the axial bearings are to run concentrically the one to the other, it must be possible to adjust one of the ball raceways, for example the inner, relatively to the other, in the present instance the outer raceway.

This condition is fulfilled in spite of the fact that the needle raceways can be eccentric to each other by the amount of radial play plus the elastic deformation path of any deviations due to running out of true.

The radial play can be kept within relatively small limits by the use of cage-guided needles. This necessarily results in slight elastic deformation because the needles are of small diameter and bear over a greater length. It is possible in a bearing thus designed to attain that the eccentricity of inner needle raceway in relation to the outer needle raceway is relatively small so that in many instances the mutual adjustability of the two raceways can be dispensed with.

In order, however, to protect when it is necessary the balls and their raceways against overloading, it is proposed by another feature of the invention, to compensate for the harmful radial pressures by providing one of the rings for the balls with a raceway at a constant distance from its central axis, whereas the other ring has a raceway which is adjustable within small limits in its distance from the same axis.

The bearing can be advantageously constructed so that an annular portion carrying the ball raceway is separated from one ring and is unsupported in radial direction on its surface remote from the raceway.

The compensation can, however, also be attained according to another feature of the invention, by making the adjustable ball raceway yieldable in approximately radial direction, for example by making it radially resistant. The compensating effect can at the same time be increased by the fact that the inner or outer ring yieldably accommodating the balls, is unsupported radially in the region of the ball raceway.

It is particularly advantageous to utilize the balls for the compensation in that their elastic deformation by the amount to be compensated for is permissible, and in addition they have point contact with their raceway. Such a bearing can be so constructed that one raceway is angular, for example a right angle and contacts the balls at two points, whereas the other raceway has a conical surface and contacts the balls at one point.

Additional advantages and features of the invention are hereinafter described with reference to the accompanying drawings which illustrate the invention by way of example. In these drawings Fig. 1 is a section thru a bearing with common cage for the needles and the balls, Fig. 2 is a similar section thru a bearing with separate cages for the needles and the balls, Fig. 3 shows the pairwise employment of two bearings on a common shaft, Fig. 4 shows a bearing with divided outer ring, Fig. 5 shows a bearing with divided inner ring, Fig. 6 shows a bearing with yieldable outer ball raceway, Fig. 7 shows a bearing with yieldable inner ball raceway, Fig. 8 shows a bearing the inner ring of which has a conical ball raceway, and Fig. 9 shows a ball raceway on an enlarged scale.

In the outer bearing ring $a$ and the inner bearing ring $b$ the raceways $c$ and $d$ for the needles $e$ are worked in the usual manner. The needle bearing thus produced is, in the example illustrated, combined with an inclined ball bearing. Therefore the needle raceways $c$ and $d$ merge into the ball raceways $f$, $f'$ which are also worked in the bearing rings $a$ and $b$.

In the form of construction illustrated in Fig. 1 the outer race ring is provided with an outer collar $g$, the companion inner ring $b$ with an inner shoulder $h$ by arcuate offsetting, whereas in the construction shown in Fig. 2 the outer ring $a$ has an inner shoulder $i$ and the inner ring $b$ an outer collar $k$.

In the bearing shown in Fig. 1, the needles $e$ and the balls $l$ are guided in a cage $m$, whereas in the bearing according to Fig. 2 the needles $e$ have their own window cage $n$, a separate comb cage $o$ being provided for the balls $l$. In this instance, if different circumferential speeds are to be used, the cages can slide slightly the one relatively to the other at the separating line $p$.

Fundamentally it is endeavoured, as above mentioned, by the choice of the diameters of the raceways, to keep the circumferential speed of the cage constant as a function of the needles and the balls.

As the balls have sufficient play under a radial load and the needles are practically free in the case of axial load, a certain amount of slip cannot lead to disturbances.

The ball bearing shown in Fig. 4 has an inner ring 1 carrying the needle raceway 2 and the ball raceway 3. The balls are maintained at a suitable distance apart by a cage 4 and the needles by a window cage 5. The inner ring is securely fixed on the shaft 6. The outer ring is divided into a part 7 and an annular part 8. The annular part 8 carries the entire raceway 9 for the balls 10. Its outer diameter should be smaller than the bore 11 in which the part 7 is fitted. The annular part 8 can therefore change its radial position in the event of any radial displacement of the shaft 6 relatively to the outer part 7. If a radial displacement of the shaft 6 takes place, the distance of the raceway 2 from the central axis of the part 7 always remains constant. On the other hand, the distance of the ball raceway 9 from the same central axis changes by the amount corresponding to the radial displacement of the shaft 6. If the radial displacement is continuous it is advisable to use antifriction materials and lubricants.

In the bearing shown in Fig. 5 the conditions are similar to those described in connection with Fig. 4. In this case the inner ring is divided into a part 7' and an annular part 8', whereas the outer ring 1' is in one piece. The annular part 8' is unsupported relatively to the shaft 6 and as a result its internal diameter is greater than the diameter of the shaft 6.

In the bearing according to Fig. 6 both the inner ring 1 and also the outer ring 1' are formed in one piece. To allow a limited radial displacement of the shaft 6 relatively to the outer ring 1', in this case the outer ring 1' is resilient in the region of the ball raceway. It is therefore made of resilient material and unsupported on the side remote from the ball raceway 9'. The outer ring 1' is preferably made by the drawing process.

As the outer ring 1' on the ball raceway is resilient it can, in the event of radial displacement of the shaft 6, yield in the direction of the displacement in the region of the balls with the result that the radial pressure forces on the balls 10 are compensated.

In the bearing illustrated in Fig. 7 the raceway of the inner ring is made yieldable. In this case also both the inner and outer rings are in one piece. The yieldable effect is increased by the annular groove 12. An annular groove need not be the means of increasing the yieldability; this might also be attained by fluting or other suitable cross-section reduction; it can even be adapted to the forces which arise.

Fig. 8 shows a bearing the inner ring 1 of which has a conical, for the most part level ball raceway 3', whereas the raceway on the outer ring 1' is cylindrical, the axial forces being taken up by the shoulder standing at right angles to the cylindrical surface.

In this construction the outer ring ball raceway contacts with the balls at two points, whereas the inner ring ball raceway is only in contact with the balls at one point. It is therefore possible, in the event of any radial displacement of the shaft, for the balls to deform elastically by the amount of the radial displacement.

The raceways for the balls, in as far as they are provided with shoulders, are constructed as shown in Fig. 9. Consequently the raceway radius R will be chosen greater than the ball radius $r$. Furthermore, the ball raceway is slightly inclined in the direction towards the shaft axis, that is, it deviates from the parallel to the shaft axis by the angle $a$.

I claim:

1. A combined radial needle bearing with needle bearing elements and axial roller bearing with roller bearing elements for absorbing the radial forces essentially only by said radial bearing and the axial forces essentially only by said axial bearing comprising an outer bearing ring and an inner bearing ring forming therebetween the raceways for said needle bearing elements and said roller bearing elements, the raceways for said needle bearing and the raceways for said roller bearing in said rings merging directly into each other uninterruptedly and at least the raceways formed by one of said ring having essentially like diametric dimensions, and cage means for at least the bearing elements of one of said bearing so as to positively limit the function of each bearing to the absorption of essentially only those forces capable of ready transmission thereby, said axial roller bearing being disposed in the axial direction near the outside of said combined bearing.

2. A combined radial needle and axial roller bearing according to claim 1, wherein said cage means is a common cage provided with windows for said needle elements and with pockets for said roller elements.

3. A combined radial needle and axial roller bearing according to claim 1 wherein said cage means includes two separate cages, one cage being provided with windows for said needle bearing means, and the other of said cages being provided with pockets for said roller bearing elements.

4. A combined radial needle and axial roller bearing according to claim 1 wherein said cage means is guided on the raceways formed by one of said rings.

5. A combined radial needle and axial roller bearing according to claim 1 wherein the radial play in the cylindrical parts of said raceways is smaller at said needle bearing elements than at said roller bearing elements.

6. A combined radial needle and axial roller bearing according to claim 1 wherein said cage means with said needle bearing elements forms a unitary assembly with one of said rings.

7. A bearing as set forth in claim 1, wherein these bearings are used in pairs and mounted on a common shaft with axial shaft thrust movement.

8. A combined needle and roller bearing according to claim 1, wherein said roller elements are balls, and wherein the raceway for said balls formed by one of said rings is at a constant distance from the axis of rotation while the raceway for said balls formed by the other of said rings is capable of limited adjustment in the radial direction thereof from said axis of rotation so as to compensate for harmful radial pressures on said balls and for differences in speed of said balls.

9. A combined radial needle and axial roller bearing according to claim 8, wherein said inner ring is yieldable in a radial direction in the region of the ball raceway and is radially unsupported thereat.

10. A combined radial needle and axial roller bearing according to claim 8, wherein said outer ring is yieldable in a radial direction in the region of the ball raceway and is radially unsupported thereat.

11. A bearing as set forth in claim 8, wherein the adjustable ball raceway is yieldable in a substantially radial direction.

12. A bearing as set forth in claim 8, wherein the adjustable ball raceway is radially resilient and yieldable in a substantially radial direction.

13. A bearing as set forth in claim 8, wherein the balls have point contact with their raceway to compensate by elastic deformation any harmful radial pressures.

14. A bearing as set forth in claim 8, wherein one of the ball raceways is angular and contacts the balls at two points, and the other ball raceway forms an essentially conical surface contacting the balls at only one point.

References Cited in the file of this patent

UNITED STATES PATENTS

| Number | Name | Date |
|---|---|---|
| 677,281 | Seagrave | June 25, 1901 |
| 1,068,018 | Stuebner | July 22, 1913 |
| 1,226,345 | Lockwood | May 15, 1917 |
| 1,304,073 | Lockwood | May 20, 1919 |
| 1,966,924 | Couch | July 17, 1934 |
| 2,040,489 | Large | May 12, 1936 |
| 2,430,359 | Messinger | Nov. 4, 1947 |